United States Patent
McKenna

(10) Patent No.: US 9,005,560 B2
(45) Date of Patent: Apr. 14, 2015

(54) $NO_x$ TRAP COMPOSITION

(71) Applicant: Johnson Matthey Public Limited Company, London (GB)

(72) Inventor: Fiona-Mairead McKenna, Pulborough (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/182,477

(22) Filed: Feb. 18, 2014

(65) Prior Publication Data

US 2014/0234190 A1 Aug. 21, 2014

Related U.S. Application Data

(60) Provisional application No. 61/765,910, filed on Feb. 18, 2013.

(51) Int. Cl.
| | |
|---|---|
| *B01D 53/94* | (2006.01) |
| *B01J 29/00* | (2006.01) |
| *B01J 29/064* | (2006.01) |
| *F01N 3/10* | (2006.01) |
| *F01N 3/28* | (2006.01) |
| *B01J 37/00* | (2006.01) |
| *B01J 29/74* | (2006.01) |
| *B01J 29/76* | (2006.01) |
| *B01J 37/16* | (2006.01) |
| *B01J 29/072* | (2006.01) |
| *F01N 3/20* | (2006.01) |
| *B01J 37/08* | (2006.01) |

(52) U.S. Cl.
CPC ............ *B01D 53/9418* (2013.01); *B01J 37/08* (2013.01); *B01J 37/16* (2013.01); *B01J 29/072* (2013.01); *B01J 29/7615* (2013.01); *B01J 2229/18* (2013.01); *B01J 2229/34* (2013.01); *B01J 2229/40* (2013.01); *B01J 37/0018* (2013.01); *F01N 3/20* (2013.01); *B01D 53/9477* (2013.01); *B01D 53/9481* (2013.01); *B01D 2253/108* (2013.01); *B01D 2253/25* (2013.01); *Y10S 502/506* (2013.01); *Y10S 502/507* (2013.01)

(58) Field of Classification Search
USPC ......... 502/60, 64, 66, 74, 326, 439, 506, 507; 423/213.5; 60/274, 299, 301
See application file for complete search history.

(56) References Cited

U.S. PATENT DOCUMENTS

| | | | |
|---|---|---|---|
| 8,425,869 B2 * | 4/2013 | Sato et al. ................. | 423/235 |
| 2011/0166014 A1 * | 7/2011 | Larcher et al. ............ | 502/304 |
| 2012/0208692 A1 | 8/2012 | Munch et al. | |
| 2012/0308439 A1 | 12/2012 | Chen et al. | |
| 2014/0044630 A1 * | 2/2014 | Swallow et al. ........... | 423/213.5 |

OTHER PUBLICATIONS

Database WPI; Week 199523; Thomson Scientific, London, GB; AN 1995-174877; XP-002723490, & JP H07 96144 A (Tosoh Corp); Apr. 11, 1995; abstract.
Gongshin Qi et al., Low-temperature SCR of NO with NH3 over noble metal promoted Fe-ZSM-5 catalysts; Catalysis Letters, Kluwer Academic Publishers-Plenum Publishers, NE; vol. 100, No. 3-4, Apr. 2005, pp. 243-246, XP019275123, ISSN: 1572-879X; p. 244, paragraph 2.1.

* cited by examiner

*Primary Examiner* — Timothy Vanoy
(74) *Attorney, Agent, or Firm* — Kevin M. Carroll

(57) ABSTRACT

A method to produce a $NO_x$ trap composition, and its use in a $NO_x$ trap and in an exhaust system for internal combustion engines, is disclosed. The $NO_x$ trap composition is produced by heating an iron-containing zeolite in the presence of an inert gas and an organic compound to produce a reductively calcined iron/zeolite. A palladium compound is then added to the reductively calcined iron/zeolite, and the resulting Pd—Fe/zeolite is then calcined at 400 to 600° C. in the presence of an oxygen-containing gas to produce the $NO_x$ trap composition. The $NO_x$ trap composition shows low temperature NO capacity below 200° C., as well as an additional NO storage temperature window in the 200 to 250° C. range.

17 Claims, No Drawings

NO$_x$ TRAP COMPOSITION

FIELD OF THE INVENTION

The invention relates to a NO$_x$ trap composition, its use in exhaust systems for internal combustion engines, and a method for treating an exhaust gas from an internal combustion engine.

BACKGROUND OF THE INVENTION

Internal combustion engines produce exhaust gases containing a variety of pollutants, including nitrogen oxides ("NO$_x$"), carbon monoxide, and uncombusted hydrocarbons, which are the subject of governmental legislation. Emission control systems are widely utilized to reduce the amount of these pollutants emitted to atmosphere, and typically achieve very high efficiencies once they reach their operating temperature (typically, 200° C. and higher). However, these systems are relatively inefficient below their operating temperature (the "cold start" period).

As even more stringent national and regional legislation lowers the amount of pollutants that can be emitted from diesel or gasoline engines, reducing emissions during the cold start period is becoming a major challenge. Thus, methods for reducing the level of NO$_x$ and hydrocarbons emitted during cold start condition continue to be explored.

For cold start NO$_x$ control, especially under lean-burn conditions, NO$_x$ storage and release catalysts have been studied. The catalysts adsorb NO$_x$ during the warm-up period and thermally desorb NO$_x$ at higher exhaust temperatures. Downstream catalysts, such as selective catalytic reduction ("SCR") or NO$_x$ adsorber catalysts ("NAC"), effectively reduce the desorbed NO$_x$ to nitrogen.

Typically, NO$_x$ adsorbent materials consist of inorganic oxides such as alumina, silica, ceria, zirconia, titania, or mixed oxides which are coated with at least one platinum group metal. PCT Intl. Appl. WO 2008/047170 discloses a system wherein NO$_x$ from a lean exhaust gas is adsorbed at temperatures below 200° C. and is subsequently thermally desorbed above 200° C. The NO$_x$ adsorbent is taught to consist of palladium and a cerium oxide or a mixed oxide or composite oxide containing cerium and at least one other transition metal.

PCT Intl. Appl. WO 2004/076829 discloses an exhaust-gas purification system which includes a NO$_x$ storage catalyst arranged upstream of an SCR catalyst. The NO$_x$ storage catalyst includes at least one alkali, alkaline earth, or rare earth metal which is coated or activated with at least one platinum group metal (Pt, Pd, Rh, or Ir). A particularly preferred NO$_x$ storage catalyst is taught to include cerium oxide coated with platinum and additionally platinum as an oxidizing catalyst on a support based on aluminum oxide. EP 1027919 discloses a NO$_x$ adsorbent material that comprises a porous support material, such as alumina, zeolite, zirconia, titania, and/or lanthana, and at least 0.1 wt % precious metal (Pt, Pd, and/or Rh). Platinum carried on alumina is exemplified.

In addition, U.S. Pat. Nos. 5,656,244 and 5,800,793 describe systems combining a NO$_x$ storage/release catalyst with a three way catalyst. The NO$_x$ adsorbent is taught to comprise oxides of chromium, copper, nickel, manganese, molybdenum, or cobalt, in addition to other metals, which are supported on alumina, mullite, cordierite, or silicon carbide. PCT Intl. Appl. WO 03/056150 describes a system combining a low temperature NO$_2$ trap material and a soot filter. The low temperature NO$_2$ trap material is taught to comprise of zeolites exchanged with base metal cations, with the zeolites selected from ZSM-5, ETS-10, Y-zeolite, beta zeolite, ferrierite, mordenite, titanium silicates and aluminum phosphates and the base metals selected from Mn, Cu, Fe, Co, W, Re, Sn, Ag, Zn, Mg, Li, Na, K, Cs, Nd and Pr.

Unfortunately, the NO$_x$ adsorption capacity of such systems is not high enough especially at high NO$_x$ storage efficiency. U.S. Pat. Appl. Pub. No. 2012/0308439 discloses an improved cold start catalyst that comprises a zeolite catalyst comprising a base metal such as iron, a noble metal, and a zeolite, and a supported platinum group metal catalyst comprising one or more platinum group metals and one or more inorganic oxide carriers.

As with any automotive system and process, it is desirable to attain still further improvements in exhaust gas treatment systems, particularly under cold start conditions. We have discovered a new NO$_x$ trap composition that provides enhanced cleaning of the exhaust gases from internal combustion engines.

SUMMARY OF THE INVENTION

The invention is a method to produce a NO$_x$ trap composition that comprises palladium and iron supported on a zeolite. The method comprises heating an iron-containing zeolite in the presence of an inert gas and an organic compound to produce a reductively calcined iron/zeolite. A palladium compound is then added to the reductively calcined iron/zeolite, and the resulting Pd—Fe/zeolite is then calcined at 400 to 600° C. in the presence of an oxygen-containing gas to produce the NO$_x$ trap composition. The invention also includes a NO$_x$ trap composition produced by the method, a NO$_x$ trap comprising the NO$_x$ trap composition supported on a substrate, and its use in an exhaust system. The NO$_x$ trap composition shows low temperature NO capacity below 200° C., as well as an additional NO storage temperature window in the 200 to 250° C. range, making it very useful in cold start applications.

DETAILED DESCRIPTION OF THE INVENTION

The method of the invention comprises heating an iron-containing zeolite in the presence of an inert gas and an organic compound to produce a reductively calcined iron/zeolite.

The iron-containing zeolite may be prepared by any known means. Preferably, the iron-containing zeolite is made by adding an iron compound to a zeolite to form the iron-containing zeolite. The iron-containing zeolite is preferably calcined at 400 to 600° C. in the presence of an oxygen-containing gas prior to use in the method of the invention. Suitable iron compounds include the nitrates, sulfates, halides (e.g., chlorides, bromides), and carboxylates (e.g. acetate) of iron.

The iron compound may be added to the zeolite by any known means, the manner of addition is not considered to be particularly critical. For example, an iron compound (such as iron nitrate) may be supported on the zeolite by impregnation, adsorption, ion-exchange, incipient wetness, precipitation, or the like.

The zeolite may be any natural or a synthetic zeolite, including molecular sieves, and is preferably composed of aluminum, silicon, and/or phosphorus. The zeolites typically have a three-dimensional arrangement of SiO$_4$, AlO$_4$, and/or PO$_4$ that are joined by the sharing of oxygen atoms. The zeolite frameworks are typically anionic, which are counterbalanced by charge compensating cations, typically alkali and alkaline earth elements (e.g., Na, K, Mg, Ca, Sr, and Ba) and also protons.

The zeolite is preferably a beta zeolite, a faujasite (such as an X-zeolite or a Y-zeolite, including NaY and USY), an L-zeolite, a ZSM zeolite (e.g., ZSM-5, ZSM-48), an SSZ-zeolite (e.g., SSZ-13, SSZ-41, SSZ-33), a mordenite, a chabazite, an offretite, an erionite, a clinoptilolite, a silicalite, an aluminum phosphate zeolite (including metalloaluminophosphates such as SAPO-34), a mesoporous zeolite (e.g., MCM-41, MCM-49, SBA-15), a metal-incorporated zeolite, or mixtures thereof; more preferably, the zeolites are beta zeolite, ZSM-5 zeolite, or SSZ-33, or Y-zeolite. The zeolite is most preferably beta zeolite.

Following the addition of the iron compound to the zeolite, the resulting iron-zeolite species is preferably calcined at 400 to 600° C. in the presence of an oxygen-containing gas (such as air). The calcination is preferably performed for greater than 1 hour.

The iron-containing zeolite is heated in the presence of an inert gas and an organic compound to produce a reductively calcined iron/zeolite. The inert gas is any gas that is substantially free of oxygen (less than 1 vol. % oxygen, preferably less than 0.1 vol. % oxygen), most preferably oxygen-free. Preferably, the inert gas is nitrogen, argon, neon, helium, carbon dioxide, or the like, and mixture thereof.

The organic compound is preferably an organic polymer and/or a biopolymer. Suitable organic polymers include polyethylenes, polypropylenes, and polyglycols such polyethylene oxides and polypropylene oxides. Suitable include polysaccharides, cellulose, and polyglucosamines and lipids. Most preferably, the organic compound is a polyethylene oxide. The organic compounds decompose at higher temperatures with exclusion of oxygen to gaseous decomposition products, which then contribute to a hydrocarbon atmosphere. The use of a reducing hydrocarbon atmosphere to produce an SCR-active zeolite catalyst containing iron is disclosed in U.S. Pat. Appl. Pub. No. 2012/0208692, the teachings of which are herein incorporated by reference.

Typically, the iron-containing zeolite and the organic compound are mixed prior to heating such that the weight ratio of organic compound:iron-containing zeolite is from 0.05 to 2, more preferably from 0.05 to 0.5. The heating is preferably conducted at a temperature ranging from 300 to 700° C., more preferably 400 to 650° C.

A palladium compound is then added to the reductively calcined iron/zeolite to form a Pd—Fe/zeolite. Suitable palladium compounds include the nitrates, sulfates, halides (e.g., chlorides, bromides), carboxylates (e.g. acetate), and amine complexes of palladium. The palladium compound may be added to the reductively calcined iron/zeolite by any known means, the manner of addition is not considered to be particularly critical. For example, a palladium compound (such as palladium nitrate) may be added to the reductively calcined iron/zeolite by impregnation, adsorption, ion-exchange, incipient wetness, precipitation, spray drying, or the like.

Following addition of the palladium compound, the Pd—Fe/zeolite is calcined at a temperature in the range of 400 to 600° C. in the presence of an oxygen-containing gas (such as air) to produce the $NO_x$ trap composition. The calcination is preferably performed for greater than 1 hour.

The invention also includes a $NO_x$ trap composition prepared according to the above method, and a $NO_x$ trap comprising the $NO_x$ trap composition supported on a metal or ceramic substrate.

The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

The metallic substrate may be made of any suitable metal, and in particular heat-resistant metals and metal alloys such as titanium and stainless steel as well as ferritic alloys containing iron, nickel, chromium, and/or aluminum in addition to other trace metals.

The substrate is preferably a flow-through substrate or a filter substrate. Most preferably, the substrate is a flow-through substrate. In particular, the flow-through substrate is a flow-through monolith preferably having a honeycomb structure with many small, parallel thin-walled channels running axially through the substrate and extending throughout the substrate. The channel cross-section of the substrate may be any shape, but is preferably square, sinusoidal, triangular, rectangular, hexagonal, trapezoidal, circular, or oval.

Preferably, the $NO_x$ trap is prepared by depositing the $NO_x$ trap composition on the substrate using washcoat procedures. A representative process for preparing the $NO_x$ trap using a washcoat procedure is set forth below. It will be understood that the process below can be varied according to different embodiments of the invention.

The washcoating is preferably performed by first slurrying finely divided particles of the $NO_x$ trap composition in an appropriate solvent, preferably water, to form a slurry. The slurry preferably contains between 5 to 70 weight percent solids, more preferably between 10 to 50 weight percent. Preferably, the particles are milled or subject to another comminution process in order to ensure that substantially all of the solid particles have a particle size of less than 20 microns in an average diameter, prior to forming the slurry. Additional components, such as stabilizers or promoters may also be incorporated in the slurry as a mixture of water soluble or water-dispersible compounds or complexes.

The substrate may then be coated one or more times with the slurry such that there will be deposited on the substrate the desired loading of the $NO_x$ trap composition.

It is also possible to form the $NO_x$ trap composition on the substrate in order to produce the $NO_x$ trap. In such a procedure, a slurry of the iron-containing zeolite is washcoated onto the substrate as described above. After the iron-containing zeolite has been deposited on the substrate, the substrate is heated in the presence of an inert gas and an organic compound to produce a reductively calcined iron/zeolite on the substrate, as described above. The palladium compound can then be added to the substrate by any known means, including impregnation, adsorption, or ion-exchange to form a Pd—Fe/zeolite on the substrate, which can then be calcined at 400 to 600° C. in the presence of an oxygen-containing gas to produce the $NO_x$ trap.

Preferably, the entire length of the substrate is coated with the $NO_x$ trap composition so that a washcoat of the $NO_x$ trap composition covers the entire surface of the substrate.

After the $NO_x$ trap composition is deposited onto the substrate, the $NO_x$ trap is typically dried by heating at an elevated temperature of preferably 80 to 150° C. and then calcined by heating at an elevated temperature. Preferably, the calcination occurs at 400 to 600° C. for approximately 1 to 8 hours.

The invention also encompasses a cold start catalyst that comprises the $NO_x$ trap composition of the invention and a supported platinum group metal catalyst comprising one or more platinum group metals and one or more inorganic oxide carriers. The supported platinum group metal catalyst comprises one or more platinum group metals ("PGM") and one or more inorganic oxide carriers. The PGM may be platinum, palladium, rhodium, iridium, or combinations thereof, and most preferably platinum and/or palladium. The inorganic oxide carriers most commonly include oxides of Groups 2, 3, 4, 5, 13 and 14 and lanthanide elements. Useful inorganic oxide carriers preferably have surface areas in the range 10 to 700 m$^2$/g, pore volumes in the range 0.1 to 4 mL/g, and pore diameters from about 10 to 1000 Angstroms. The inorganic oxide carrier is preferably alumina, silica, titania, zirconia, ceria, niobia, tantalum oxides, molybdenum oxides, tungsten oxides, or mixed oxides or composite oxides of any two or more thereof, e.g. silica-alumina, ceria-zirconia or alumina-ceria-zirconia. Alumina and ceria are particularly preferred.

The supported platinum group metal catalyst may be prepared by any known means. Preferably, the one or more platinum group metals are loaded onto the one or more inorganic oxides by any known means to form the supported PGM catalyst, the manner of addition is not considered to be particularly critical. For example, a platinum compound (such as platinum nitrate) may be supported on an inorganic oxide by impregnation, adsorption, ion-exchange, incipient wetness, precipitation, or the like. Other metals may also be added to the supported PGM catalyst.

The cold start catalyst may be prepared by processes well known in the prior art. The NO$_x$ trap and the supported platinum group metal catalyst may be physically mixed to produce the cold start catalyst. Preferably, the cold start catalyst further comprises a flow-through substrate or filter substrate, such that the NO$_x$ trap composition and the supported platinum group metal catalyst are coated onto the flow-through or filter substrate, and preferably deposited on the flow-through or filter substrate using a washcoat procedure to produce a cold start catalyst system.

The invention also encompasses an exhaust system for internal combustion engines that comprises the NO$_x$ trap of the invention. The exhaust system preferably comprises one or more additional after-treatment devices capable of removing pollutants from internal combustion engine exhaust gases at normal operating temperatures. Preferably, the exhaust system comprises the cold start catalyst and: (1) a selective catalytic reduction system; (2) a particulate filter; (3) a selective catalytic reduction filter system; (4) a NO$_x$ adsorber catalyst; (5) a three-way catalyst system; or any combination thereof.

These after-treatment devices are well known in the art. Selective catalytic reduction (SCR) systems are devices that reduce NO$_x$ to N$_2$ by reaction with nitrogen compounds (such as ammonia or urea) or hydrocarbons (lean NO$_x$ reduction). A typical SCR catalyst is comprised of a vanadia-titania catalyst, a vanadia-tungsta-titania catalyst, or a metal/zeolite catalyst such as iron/beta zeolite, copper/beta zeolite, copper/SSZ-13, copper/SAPO-34, Fe/ZSM-5, or copper/ZSM-5.

Particulate filters are devices that reduce particulates from the exhaust of internal combustion engines. Particulate filters include catalyzed particulate filters and bare (non-catalyzed) particulate filters. Catalyzed particulate filters (for diesel and gasoline applications) include metal and metal oxide components (such as Pt, Pd, Fe, Mn, Cu, and ceria) to oxidize hydrocarbons and carbon monoxide in addition to destroying soot trapped by the filter.

Selective catalytic reduction filters (SCRF) are single-substrate devices that combine the functionality of an SCR and particulate filter. They are used to reduce NO$_x$ and particulate emissions from internal combustion engines.

NO$_x$ adsorber catalysts (NACs) are designed to adsorb NO$_x$ under lean exhaust conditions, release the adsorbed NO$_x$ under rich conditions, and reduce the released NO$_x$ to form N$_2$. NACs typically include a NO$_x$-storage component (e.g., Ba, Ca, Sr, Mg, K, Na, Li, Cs, La, Y, Pr, and Nd), an oxidation component (preferably Pt) and a reduction component (preferably Rh). These components are contained on one or more supports.

Three-way catalyst systems (TWCs) are typically used in gasoline engines under stoichiometric conditions in order to convert NO$_x$ to N$_2$, carbon monoxide to CO$_2$, and hydrocarbons to CO$_2$ and H$_2$O on a single device.

The invention also encompasses treating an exhaust gas from an internal combustion engine, in particular for treating exhaust gas from a vehicular lean burn internal combustion engine, such as a diesel engine, a lean-burn gasoline engine, or an engine powered by liquid petroleum gas or natural gas. The method comprises contacting the exhaust gas with the NO$_x$ trap of the invention.

The following examples merely illustrate the invention. Those skilled in the art will recognize many variations that are within the spirit of the invention and scope of the claims.

EXAMPLE 1

Preparation of Catalysts

Catalyst 1A: Catalyst 1A is prepared by wet impregnation of Fe nitrate onto Beta zeolite (Tosoh HSZ® 931), followed by calcination at 500° C. in air. The resulting powder is mixed with 8 wt. % polyethylene oxide and is calcined at 600° C. in the presence of nitrogen gas. Palladium is then impregnated onto the Fe/Beta material to a loading of 1 wt. % Pd, and the Pd—Fe/Beta product is then calcined at 500° C. in air to produce Catalyst 1A (containing 1 wt. % Pd and 1 wt. % Fe).

Comparative Catalyst 1B: Comparative Catalyst 1B is prepared according to the procedure of Catalyst 1A, except that the reductive calcination step (in the presence of polyethylene oxide) is not performed. Comparative Catalyst 1B contains 1 wt. % Pd and 1 wt. % Fe.

Comparative Catalyst 1C: Comparative Catalyst 1C is prepared according to the procedure of Comparative Catalyst 1B, with the exception that the Pd—Fe/Beta product is calcined at 750° C., instead of at 500° C. Comparative Catalyst 1C contains 1 wt. % Pd and 1 wt. % Fe.

Comparative Catalyst 1D: Comparative Catalyst 1D is prepared by wet impregnation of Fe nitrate onto Beta zeolite (Tosoh HSZ® 931), followed by a calcination at 500° C. in air. A direct reduction treatment in dilute H$_2$ at 500° C. for 2 hours is subsequently carried out. Palladium is then impregnated onto the Fe—Beta material to a loading of 1 wt. % Pd, and the Pd—Fe/Beta product is then calcined at 500° C. in air to produce Comparative Catalyst 1D (containing 1 wt. % Pd and 1 wt. % Fe).

EXAMPLE 2

NO$_x$ Storage Testing Procedures

The catalyst (0.4 g) is held at 90° C. for 5 minutes in an NO-containing gas, then the temperature is increased to 215° C. at a ramping rate of 20° C./minute to achieve a bed temperature of 200° C., where the catalyst is held for a further 5 minutes followed by a further ramp to 290° C. and a bed temperature of 275° C. for another 5 minutes. This adsorption stage is followed by Temperature Programmed Desorption (TPD) in the presence of a TPD gas until the bed temperature reaches about 500° C. in order to purge the catalyst of all stored NO$_x$ for further testing.

The NO-containing gas comprises 10.5 vol. % O$_2$, 50 ppm NO, 6 vol. % CO$_2$, 1500 ppm CO, 100 ppm hydrocarbons and 6.3 vol. % H$_2$O.

The TPD gas comprises 10.5 vol. % $O_2$, 6 vol. % $CO_2$, 1500 ppm CO, 100 ppm hydrocarbons and 6.3 vol. % $H_2O$.

The $NO_x$ storage results are shown in Table 1.

The storage test results show that there are two distinct temperature windows where $NO_x$ is adsorbed on the different catalysts. The lower temperature window at approximately 90° C. is crucial to cold-start performance. Higher $NO_x$ storage in this low temperature range indicates greater potential for use in cold start applications. The higher temperature window between 200-250° C. is useful to avoid $NO_x$ slip during high load operation. The results at Table 1 show that only Catalyst 1A and Comparative Catalyst 1C (subjected to high temperature 750° C. calcination) demonstrate good $NO_x$ uptake in the low temperature (cold start) window. However, the high temperature treatment required to activate Comparative Catalyst 1C is undesirable and costly. Further, the higher temperature calcined Comparative Catalyst 1C material does not demonstrate $NO_x$ uptake in the high temperature (200-250° C.) region of the test and therefore has a low $NO_x$ uptake capacity overall.

TABLE 1

$NO_x$ Storage Results

| Catalyst | $NO_x$ Storage (g/L) | |
| --- | --- | --- |
| | Low temp | High temp |
| 1A | 0.36 | 0.55 |
| 1B * | 0.05 | 0.26 |
| 1C * | 0.34 | 0.08 |
| 1D * | 0.03 | 0.35 |

* Comparison Example

We claim:

1. A method to produce a $NO_x$ trap composition comprising:
   (a) heating an iron-containing zeolite in the presence of an inert gas and an organic compound to produce a reductively calcined iron/zeolite;
   (b) adding a palladium compound into the reductively calcined iron/zeolite to form a Pd—Fe/zeolite; and
   (c) calcining the Pd—Fe/zeolite at 400 to 600° C. in the presence of an oxygen-containing gas to produce the $NO_x$ trap composition.

2. The method of claim 1 wherein the zeolite is selected from the group consisting of a beta zeolite, a faujasite, an L-zeolite, a ZSM zeolite, an SSZ-zeolite, a mordenite, a chabazite, an offretite, an erionite, a clinoptilolite, a silicalite, an aluminum phosphate zeolite, a mesoporous zeolite, and mixtures thereof.

3. The method of claim 1 wherein the zeolite is a beta zeolite.

4. The method of claim 1 wherein the inert gas is selected from the group consisting of nitrogen, argon, neon, helium, carbon dioxide, and mixtures thereof.

5. The method of claim 1 wherein the organic compound is an organic polymer and/or a biopolymer.

6. The method of claim 5 wherein the organic compound is a polyethylene, a polypropylene, a polyglycol, a polysaccharide, cellulose, a polyglucosamine, and a lipid.

7. The method of claim 5 wherein the organic compound is a polyethylene oxide.

8. The method of claim 1 wherein the palladium compound is a nitrate, sulfate, halide, carboxylate, or amine complex of palladium.

9. The method of claim 1 wherein the iron-containing zeolite is prepared by adding an iron compound into a zeolite to form an iron-zeolite species, and calcining the iron-zeolite species at 400 to 600° C. in the presence of an oxygen-containing gas to produce the iron-containing zeolite.

10. The method of claim 9 wherein the iron compound is a nitrate, sulfate, halide, or carboxylate complex of iron.

11. A $NO_x$ trap composition prepared according to the method of claim 1.

12. A $NO_x$ trap comprising the $NO_x$ trap composition of claim 11 supported on a metal or ceramic substrate.

13. The $NO_x$ trap of claim 12 wherein the substrate is a flow-through monolith.

14. An exhaust system for internal combustion engines comprising the $NO_x$ trap of claim 12.

15. The exhaust system of claim 14 further comprising: a selective catalytic reduction catalyst system; a particulate filter; a selective catalyst reduction filter system; a $NO_x$ adsorber catalyst; a three-way catalyst system; or combinations thereof.

16. A method for treating an exhaust gas from an internal combustion engine comprising contacting the exhaust gas with the $NO_x$ trap of claim 12.

17. A cold start catalyst comprising the $NO_x$ trap composition of claim 11 and a supported platinum group metal catalyst comprising one or more platinum group metals and one or more inorganic oxide carriers.

* * * * *